United States Patent
Carley

(10) Patent No.: US 9,553,811 B2
(45) Date of Patent: Jan. 24, 2017

(54) METHOD AND APPARATUS FOR REDUCING FLOOD TRAFFIC IN TRAIN SWITCHES

(71) Applicant: Jeffrey Alan Carley, Colorado Springs, CO (US)

(72) Inventor: Jeffrey Alan Carley, Colorado Springs, CO (US)

( * ) Notice: Subject to any disclaimer, the term of this patent is extended or adjusted under 35 U.S.C. 154(b) by 0 days.

(21) Appl. No.: 14/228,841

(22) Filed: Mar. 28, 2014

(65) Prior Publication Data

US 2015/0281095 A1  Oct. 1, 2015

(51) Int. Cl.
| | |
|---|---|
| H04L 12/26 | (2006.01) |
| H04L 12/801 | (2013.01) |
| H04L 12/939 | (2013.01) |
| H04L 12/18 | (2006.01) |
| H04L 12/931 | (2013.01) |

(52) U.S. Cl.
CPC .......... H04L 47/15 (2013.01); H04L 12/1886 (2013.01); H04L 47/10 (2013.01); H04L 49/552 (2013.01); H04L 49/201 (2013.01); H04L 49/354 (2013.01)

(58) Field of Classification Search
CPC .......... H04L 45/54; H04L 47/10; H04L 47/30; H04L 47/32; H04L 47/35; H04L 47/15; H04L 49/201; H04L 49/552
See application file for complete search history.

(56) References Cited

U.S. PATENT DOCUMENTS

| | | | |
|---|---|---|---|
| 5,920,699 A * | 7/1999 | Bare .............................. | 709/225 |
| 6,032,194 A * | 2/2000 | Gai et al. ...................... | 709/239 |
| 6,247,058 B1 * | 6/2001 | Miller et al. .................. | 709/234 |
| 6,976,088 B1 * | 12/2005 | Gai et al. ...................... | 709/238 |
| 7,116,672 B1 * | 10/2006 | Sivakumar .................. | 370/395.4 |
| 7,209,435 B1 * | 4/2007 | Kuo et al. ..................... | 370/219 |
| 8,625,423 B2 * | 1/2014 | Yano et al. .................. | 370/230.1 |
| 8,625,603 B1 * | 1/2014 | Ramakrishnan et al. . | 370/395.3 |
| 2002/0009081 A1 * | 1/2002 | Sampath et al. .............. | 370/389 |
| 2004/0133619 A1 * | 7/2004 | Zelig et al. ................... | 709/200 |
| 2005/0094634 A1 * | 5/2005 | Santhanakrishnan et al. ............................. | 370/389 |
| 2005/0286537 A1 * | 12/2005 | Shimada .................. | 370/395.53 |
| 2006/0002386 A1 * | 1/2006 | Yik et al. ...................... | 370/389 |
| 2006/0045024 A1 * | 3/2006 | Previdi et al. ................ | 370/254 |
| 2006/0109802 A1 * | 5/2006 | Zelig et al. ................... | 370/258 |
| 2007/0086361 A1 * | 4/2007 | Allan et al. ................... | 370/254 |
| 2008/0219149 A1 * | 9/2008 | Yoo .............................. | 370/217 |
| 2009/0185571 A1 * | 7/2009 | Tallet ............................ | 370/401 |
| 2010/0020814 A1 * | 1/2010 | Thyni ........................... | 370/412 |
| 2010/0226260 A1 * | 9/2010 | Zinjuvadia et al. .......... | 370/248 |
| 2014/0161131 A1 * | 6/2014 | Yang et al. ................... | 370/401 |

* cited by examiner

*Primary Examiner* — Ian N Moore
*Assistant Examiner* — Phong La

(57) ABSTRACT

An improved method and apparatus for making forwarding decisions in a switching device. The invention reduces the flooding of frames to particular network segments connected to the switch. To insure a device sees a frame addressed to it, if a switch does not know what segment a device address is connected to for a unicast frame, the switch typically floods the frame to all segments in the broadcast domain. This invention allows segments to be identified as having a predefined maximum number of device addresses that will be associated with it. When that number of addresses is already in the forwarding table the switch will not flood unicast frames to that segment since no more devices should be connected to that segment.

3 Claims, 18 Drawing Sheets

Port Configuration
Record Example

Speed: 1000
Duplex: Full
Mode: Access
VLAN: 10
Portfast
Limited-flood

METHOD AND APPARATUS FOR REDUCING FLOOD TRAFFIC IN TRAIN SWITCHES

CROSS-REFERENCE TO RELATED APPLICATIONS

The present application is a continuation of and claims priority on U.S. patent application Ser. No. 13/557,901, filed on Jul. 25, 2012, which is a continuation of U.S. patent application Ser. No. 12/396,407, filed Mar. 2, 2009, now U.S. Pat. No. 8,279,867, which was based on U.S. Provisional Application Ser. No. 61/033,013, filed Mar. 2, 2008, all of which are hereby incorporated by reference.

FIELD OF THE INVENTION

The present invention relates in general to network switches and, more specifically, methods and mechanisms for making forwarding decisions in network switches.

TERMINOLOGY bitmap - - - a array of binary bits used to communicate a choice between two values for each of a group of objects.

bridge - - - A device for connecting multiple network segments at layer 2.

bridge protocol data units - - - A frame sent by many layer 2 technologies to avoid network loops at layer 2.

broadcast address - - - An address specifying all devices in a broadcast domain.

destination device address - - - The device address of the destination of a frame.

device - - - A computer system communicating on a network.

device address - - - In the context of this application, the layer 2 datalink address of the device such as the MAC address.

duplex - - - Indicates communication takes place in both directions. The duplex setting indicates how the two way communication takes place. See full-duplex and half-duplex.

ethernet - - - A networking technology for local area networks.

fabric - - - The backbone of a switching device thall allows the line cards to communicate with each other as well as other possible functions.

filtering - - - Not sending frames on every network segment if the switching device or bridge knows which network segment connects to the destination.

flooding - - - Sending a frame out all ports of a switch or VLAN.

forwarding database - - - same as forwarding table.

forwarding decision - - - The decision of on which ports to forward frames.

forwarding table - - - The database of information learned by the switch allowing it to know on what ports addresses have been recently seen as source addresses indicating the port on with to forward frames for that address.

frame - - - a data link layer data packet.

full duplex - - - Full duplex allows simultaneous communications in both directions.

half duplex - - - Half duplex only allows communication in one direction at a time.

limited flooding logical network segment - - - A network segment that has been identified for utilizing the current invention in order to reduce unnecessary frames on the network segment.

line card - - - A card that can plug into a switching device that includes a group of ports as well as other circuitry.

loaded - - - The number of learned addresses on a network segment is equal to or greater than the expected maximum addresses to be used on that segment.

logical network - - - a subset of ports on a switching device grouped together by a logical means. A VLAN is an example of a logical network.

logical network segment - - - A subset of devices on a physical network segment that are grouped together by a logical means such as belonging to the same VLAN.

MAC address - - - A layer 2 address for a device.

mask - - - a bitmap used to select a subset of another bitmap.

mode of operation - - - Indicates a network segment is operating as a trunk (carrying frames for multiple VLANs) or as an access port (carrying frames for only one VLAN).

multicast address - - - An address specifying a group of devices.

network segment - - - A portion of a network that belongs to the same collision domain for a local area network.

physical network segment - - - A portion of a network where every device utilizes the same physical transmission medium.

port - - - The interface circuitry on a switching device for connecting a network segment.

portmask - - - a bitmap used to select a subset of ports.

segment - - - Same as network segment. Could be a physical network segment or a logical network segment.

source device address - - - The device address of the source of a frame.

switching device - - - A device for connecting network segments.

target logic - - - The means for selecting a target group of ports for forwarding a frame.

traffic - - - the flow of frames.

trunk - - - A network segment that transports frames for multiple VLANs.

unicast address - - - An address specifying a unique device.

virtual local area network - - - A logical grouping of devices in a network forming a separate broadcast domain.

VLAN - - - A Virtual Local Area Network.

BACKGROUND OF THE INVENTION

The present invention is an improvement of the prior art for use in network switching that allows for the learning of destination MAC addresses on various network segments connected to a switching device. This standard mechanism allows for dynamic leaning of the location of destination MAC addresses and then once a destination is leaned allows the switching device to filter the frame from being sent on network segments other than the one containing the destination MAC.

There is substantial prior art concerning network switches and learning mechanisms and maintenance of forwarding tables. The following are some patents related to this topic and are hereby incorporated in their entirety by reference:

U.S. Pat. No. 6,735,198 titled Method and Apparatus for Updating and Synchronizing Forwarding Tables in a Distributed Network Switch, U.S. Pat. No. 6,807,172 titled Method and Apparatus for Learning and Switching Frames in a Distributed Network Switch, U.S. Pat. No. 6,829,651 titled Local MAC Address Learning in Layer 2 Frame Forwarding, and Unified Table for L2, L3, L4, Switching and Filtering.

FIG. 1 is a diagram of a prior art switch. The illustrated switch has multiple line cards connected to a switching fabric, but this invention can be used on a wide variety of switching platforms such as fixed switches as well. The depicted switch has multiple line cards each with a set of ports and a line card processor, a forwarding database or forwarding table, and target logic for selecting groups of ports for that line card. The line cards communicate over the switch fabric with the fabric processor and the central forwarding database and target logic. The synchronizing of the various forwarding tables is not the subject of this invention and is discussed in some of the referenced patents.

The prior art method for learning and filtering frames in a switching device is depicted in FIGS. 2-6. Forwarding tables would start out not knowing any dynamic destination addresses. Static entries in the forwarding table will not be discussed here.

As shown in FIG. 2, when an ingress port receives a frame for its connected network segment, the line card makes a forwarding decision based on the destination device address (typically a MAC address) and the content of the forwarding table. When there is an entry in the forwarding table, it typically will include the device address and the port that connects to the network segment where the device with that address is located. The switching device will also examine the source address for the frame and perform address learning for that source address.

FIG. 3 further illustrates the prior art forwarding decision process for a received frame. The destination addresses is looked up in the forwarding database or forwarding table. If the destination address is found in the forwarding table, the forwarding of the frame will be targeted to the port specified in the forwarding table. It the destination address is not in the forwarding database, then the forwarding of the frame will be flooded out all the ports so that if the device is connected to any of the ports on the switch it will see the frame. In this case, no filtering is performed except that the frame is not flooded back out the same port it was receive on.

After the Ingress line card has completed the forwarding decision, it will also perform address learning as depicted in FIG. 6. The processor looks up the source address in the forwarding database. If the source address is already in the forwarding database for the port the frame was received on, the processor updates a timer to indicate the source address has been seen again on that port. If the source address is not in the forwarding database the processor enters the source address into the forwarding database indicating the device with that address is on the port the frame was received from.

At the egress card, which could also be the same card as the ingress card, if the destination address was found in the forwarding table, a targeted forwarding is being performed as is depicted in FIG. 4. The egress line card receives the frame from the ingress line card and using the target logic and information contained in the frame or in the frame header (not shown) the line card is able to forward the frame on only the port indicated in the forwarding table.

As depicted in FIG. 5, if there was not any entry in the forwarding table for the destination device address or the frame is a multicast or broadcast frame, the frame is forwarded to all of the line cards and each line card forwards the frame out every port. This is referred to as flooding the frame out all the ports.

The discussion so far is the case when a switch is a part of only one broadcast domain. Many switches now support Virtual Local Area Networks or VLANs. VLANs allow the ports in the switched network to be grouped into multiple broadcast domains. When a frame needs to be flooded out the ports of a switch, it only needs to be flooded out the ports that are associated with the same VLAN as the VLAN on which the frame was received. This is also still prior art.

FIG. 7 depicts the process of flooding a frame out the ports associated with a VLAN instead of all the ports of the switch. A frame is received at the egress line card with either a destination address that is not in the forwarding table or with a multicast or broadcast address. Therefore the frame is to be flooded out all ports associated with the VLAN. One method of selecting the ports for flooding the frame is to maintain a VLAN port mask for each VLAN on a switch such as is depicted in FIG. 8. In this example, each line card maintains a VLAN Port mask for each VLAN in use by any of the ports on the line card. The mask includes a 1 value for each port that is a logical network segment for that VLAN and a 0 for each port that is not part of the VLAN. So in FIG. 7 when flooding a frame out the ports for a VLAN on the line card, the line card can use the VLAN port mask for selecting the ports for forwarding. The egress line card then forwards the frame out the selected VLAN ports on the line card.

The purpose of flooding the frame out all ports or all ports in the VLAN is to be sure the destination sees the frame if the destination address isn't in the forwarding table. The devise address is only added to the table dynamically if the device sends a frame causing the switch to see the device address as the source address in a frame. However, if it is known that the destination address is not on a particular port, there is no reason to flood the frame out that port.

An object of the present invention is to provide a method and mechanism for reducing the flooding of unicast frames for identified network segments on a switch.

Another object of the present invention is to provide a method and mechanism for identifying network segments for which unicast flooding of frames can be eliminated.

Another object of the present invention is to provide a method and mechanism for identifying ports to be excluded from unicast flooding at the time of frame forwarding.

Another object of the present invention is to provide a method and mechanism for preventing a dynamically learned MAC address from aging out of the forwarding table.

Another object of the present invention is to provide a method and mechanism for preventing the flooding of unicast frames on a network segment that supports multiple VLANs when not all VLANs even when not all configured VLANs are being utilized.

Finally, it is an object of the present invention to accomplish the foregoing objectives in a simple and cost effective manner.

BRIEF SUMMARY OF THE INVENTION

This invention is a mechanism for identifying particular network segments that will not have an unknown destination address and therefore do not need to have the unicast frames flooded to it.

Essentially, if it is known that a segment will only have a limited number of devices and device addresses connected to it, once those device addresses are learned, there is no need to flood frames for unknown destination addresses to that segment. The simplest case is when a segment is known to only support one device and one device address at a time. This is the case with the majority of switch connections to end user devices with the current typical network topology.

Since the segment can be a physical network segment or a VLAN on a physical network segment which can be seen as a logical network segment, and a physical network segment can be seen as the simplest form of a logical network segment, the term logical network segment (LNS) will be used for discussion of this invention. A network segment that has been identified as having a known maximum number of device addresses that will be in concurrent use on the network segment and for which this invention is to be used to reduce flood traffic on that LNS shall be referred to as a limited flood logical network segment or LFLNS.

On the switching device, one or more of the network segments will be identified as LFLNS segments. This could be accomplished via administrative configuration, or could be accomplished based upon characteristics of the port. The maximum number of addresses that will be in concurrent use on the network segment will also be determined.

A preferred exemplary embodiment of the current invention would keep a count of the number of addresses for a LFLNS are currently in the forwarding table of the switching device. When a new address is learned the count is incremented and when an address ages out the count is decremented by one. When the count is equal to or greater than the determined maximum addresses for that LFLNS then unicast frames in which the network segment for the destination address is unknown will not be flooded out that LFLNS. A port mask can be kept for each logical network (or VLAN) identifying which ports should by flooded for unicast frames with destination addresses that are not in the forwarding table for that logical network and which LFLNS ports should not be flooded.

In an alternate preferred exemplary embodiment of the current invention, whenever a new address is learned of aged out for an LFLNS segment, the addresses in the forwarding table for the LFLNS is looked up. If the number of addresses is less than the expected maximum number of addresses for that segment then the mask is set to indicate unicast frames with destination addresses that are not in the forwarding table for that logical network are not to be flooded to that LFLNS. If the number of addresses is equal to or greater than the expected maximum number of addresses for that segment then the mask is set to indicate unicast frames with destination addresses that are not in the forwarding table for that logical network are NOT to be flooded to that LFLNS.

In addition, it can be advantageous to keep a dynamically learned address in the forwarding table even when a device is not sending traffic for a period of time. This can be accomplished by the switching device sending a frame to the device shortly before the address will age out that will normally generate a response from the device, such as a reverse address resolution protocol (RARP) frame. This way, as long as the device is still connected to that LNS the address will remain in the forwarding table, but when the device is disconnected for that LNS or is turned off its address will age out and be removed from the forwarding table according to prior art.

Along the same lines, it can be useful to not have an LFLNS flooded when a device is not connected to the VLAN for that LFLNS. For example with an IP Phone with an integrated data switch port. If the computer is not connected to the data switch port or the computer is powered off, the VLAN for the data switch port will be flood. This invention includes a method or mechanism for use on a device such as the IP phone where when the computer is not attached to the switch port or is powered off, the device will send occasional frames on the VLAN with its own MAC address as the source address. If the VLAN on the switch for the data switch port were configured as an LFLNS with an maximum number of address of 1, when the data port is not in use the device will cause one address to still stay in the forwarding table so that flooding will not occur on the segment, but when the computer is connected and powered up, the device address for the device will age out. Also, an entry for the computer will be added as soon as it sends a frame even if the device address for the IP phone has not yet aged out.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIG. 1 through FIG. 8 are described in the BACKGROUND OF THE INVENTION section.

Figures 9, 10:
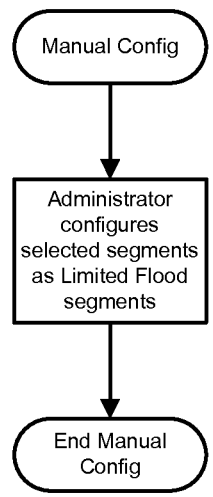
FIG. 9 illustrates the process of manual configuration of a network segment as a Limited Flood network segment.
FIG. 10 depicts a set of possible parameters for a particular port.

FIG. 9 depicts the process of administratively selecting a network segment to be an LFLNS. A preferred illustrative embodiment would be to the configuration of an interface or port characteristic such as "limited-flood" through the use of a interface command. This command could also take a parameter of the maximum number of addresses expected to be concurrently in use on the port or interface. For example "limited-flood 1" would indicate that only 1 address is expected to be concurrently in use on the port. A suggested default for the maximum number of addresses expected to be concurrently in use on the port or interface the "limited-flood" command does not include the parameter specifying the value is 1.

FIG. 10 shows a table of possible characteristics that might be configured for a port or interface. The illustrative characteristics includes speed, duplex, mode (access or trunk) VLAN, Portfast (a Cisco spanning tree tuning setting), and limited-flood. Note that in the table, since a parameter is not included the default maximum number of concurrent device addresses will be 1.

Figure 11:
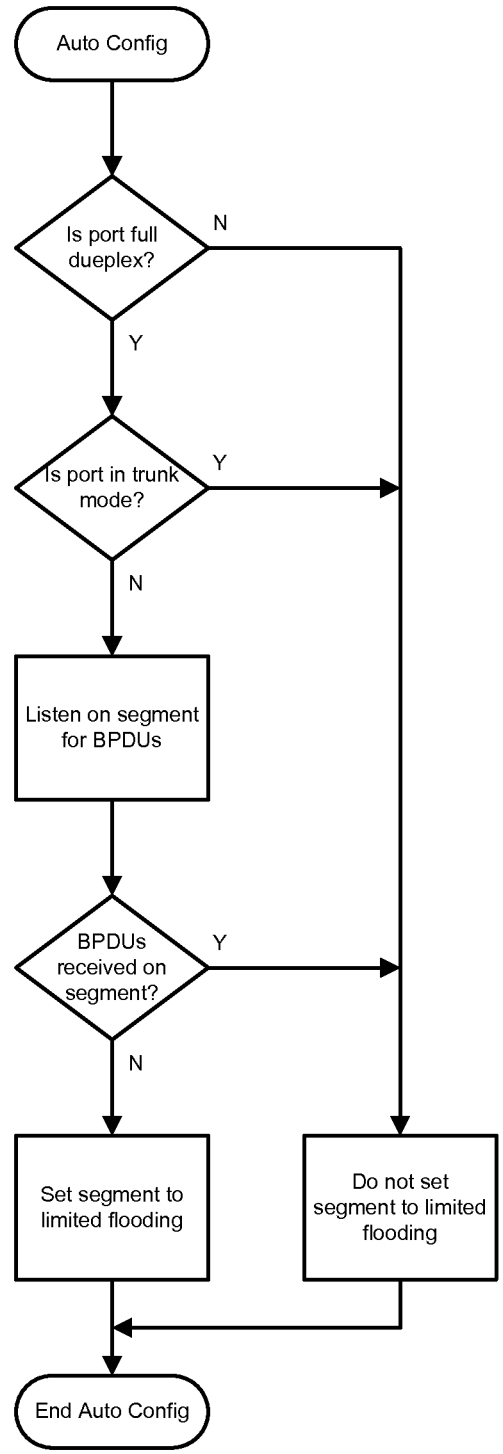
FIG. 11 illustrates the process an exemplary process of selecting the Limited Flood configuration of a network segment based upon other parameter settings for the network segment.

FIG. 11 illustrates the process of setting the "limited-flood" characteristic for the network segment using other characteristics of the network segment. In this illustrative case, if the port is not configured to use full duplex communication at the data link layer or is configured to be a trunk then the port is not set for "limited-flooding". If the port is configured to use full duplex and is not configured to be a trunk then the port listens for Bridge Protocol Data Units (BPDUs) on the interface to a determined length of time. If it does not detect BPDUs on the segment then it sets the port characteristic for "limited-flooding". If it does detect BPDUs then it sets the port characteristic for not "limited-flooding". This is just an exemplary set of characteristics for electing to set a segment to be an LFLNS. Other combinations of characteristics are also possible.

Figure 12:
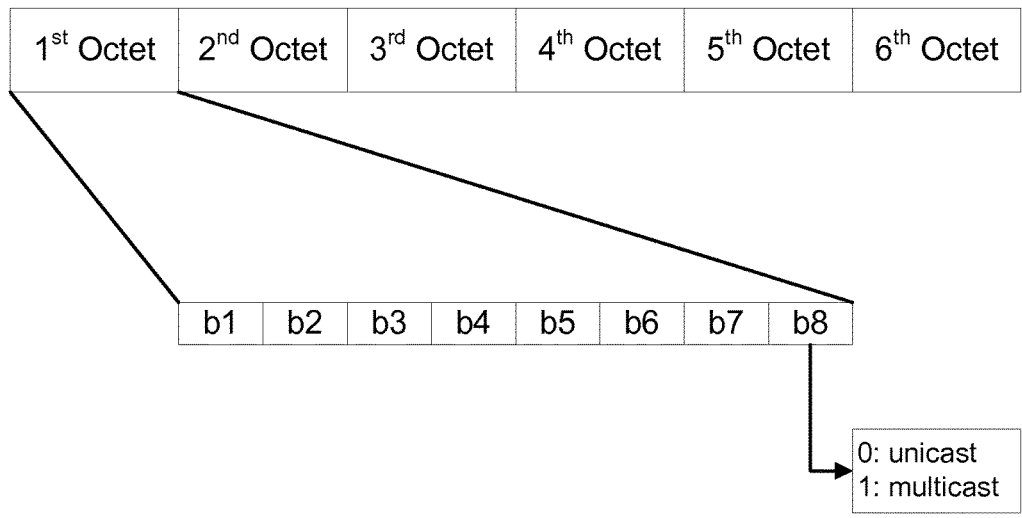
FIG. 12 depicts the bit in the header of an Ethernet MAC address that identifies if the address is a unicast or multicast MAC address.

One aspect of the invention is that this limit on the flooding should only be used for unicast frames when the destination device address is not in the forwarding table. Multicast and Broadcast frames should still be forwarded to all segments in the broadcast domain. To this end, it is important to identify unicast frames. When the device address is a MAC address such as those used with IEEE 802.3, there is a bit in the MAC address that indicates if the address is a unicast frame or multicast frame. The bit is also set the same as the multicast value for broadcast frames. This bit is depicted in FIG. 12 as the $8^{th}$ bit of the $1^{st}$ octet of the MAC address. In this example, checking this bit will determine if the frame is a unicast frame or not, but any method of determining if the frame is a unicast frame is acceptable.

Figure 13:
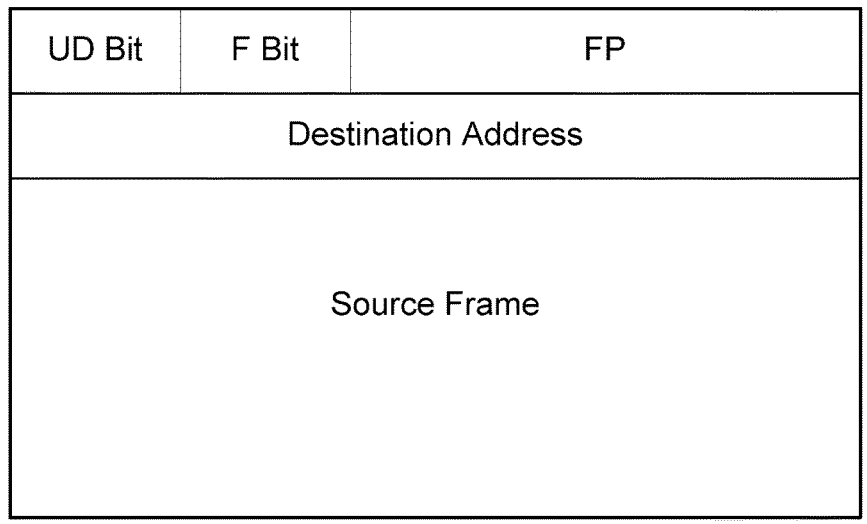
FIG. 13 depicts an exemplary header placed on a framed during ingress processing.

Once it is determined if the frame is a unicast frame or not, it could be useful to include this information in a header attached to the frame as it is transported through the switching device (such as between line cards). It could also be useful to indicate if the forwarding decision determined the frame should be flooded because the destination address was not in the forwarding table. If the destination device address was in the forwarding table, the header could include the information indicating the line card the target port for forwarding is on and the destination port on that line card. FIG. 13 depicts an exemplary header to the received frame than includes a UD bit specifying if the destination was a unicast destination or not, an F bit indicating if the frame needs to be flooded on the broadcast domain, an FP field specifying the fabric port or line card for a targeted forwarding, and a destination address specifying the port on the line card for forwarding.

Figure 14:
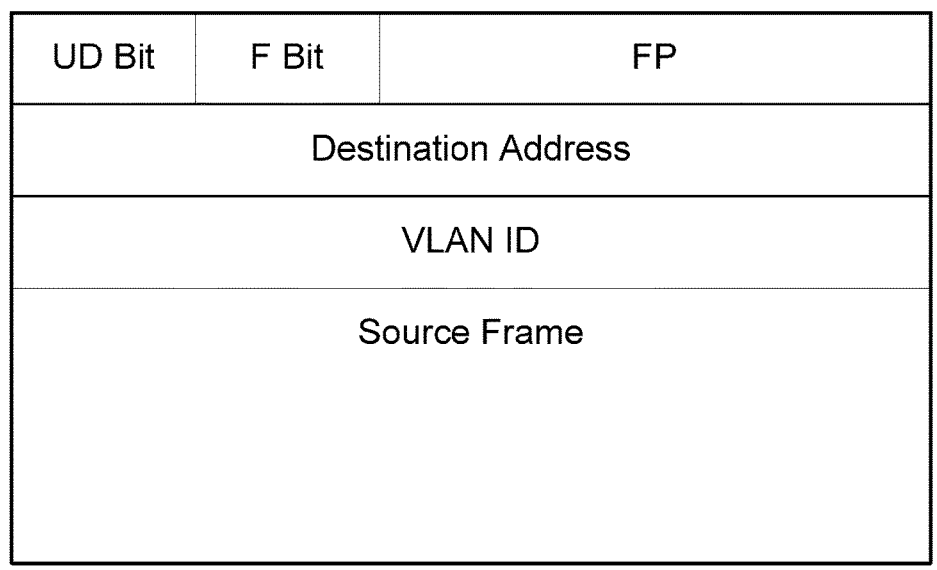
FIG. 14 depicts an exemplary header placed on a framed during ingress processing in switching devices that support VLANs.

FIG. 14 depicts the same header as FIG. 13 with the addition of a VLAN ID field specifying the VLAN on with the frame was received. When the switching device is using VLANs, the frame will only be flooded out other ports associated with the same VLAN.

Figure 15:
FIG. 15 depicts a limited flood mask indicating on which network segments unicast flood frames should be forwarded.

FIG. 15 depicts a limited flood mask that can be used to identify which segments on a line card do not need to receive flood traffic for unicast frames to destination addresses not in the forwarding table. In this exemplary embodiment there is a bit value for each port on the line card. If a port should receive flood traffic for unicast frames to destination addresses not in the forwarding table the limited-flooding mask had a 1 value and if the port should not receive flood traffic for unicast frames to destination addresses not in the forwarding table the limited-flooding mask had a 0 value. If the switching device supports VLANs an instance of the limited-flooding mask can be maintained for each VLAN on a card. This allows the limited-flooding mask to be logically ANDed with the VLAN mask to determine what ports the frame should be forwarded out.

Figure 16:
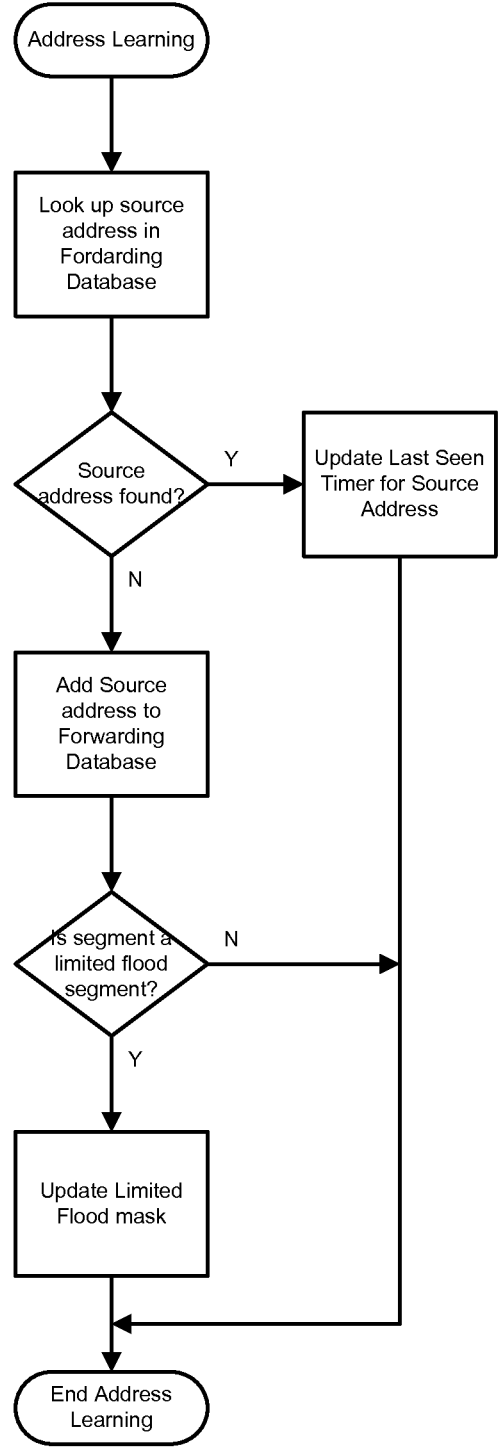
FIG. 16 illustrates the improved address learning process when a frame is received on a Limited Flood network segment.
Figure 17:
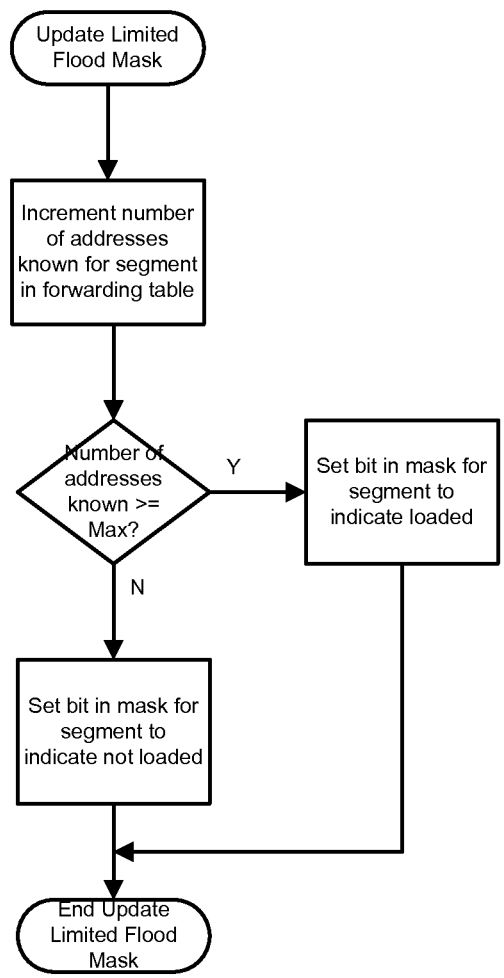
FIG. 17 illustrates the process for updating the limited flood mask during the address learning process.

FIG. 16 and FIG. 17 depict how the bits in the bit mask of FIG. 15 are determined.

FIG. 16 depicts the illustrative exemplary embodiment of the innovative address learning process that is part of this invention. This process takes place at the Address Learning stage of FIG. 2 when a frame is received. In the address learning process of FIG. 16, the source address of a received frame is looked up in the forwarding database. If the address is found, the last-seen timer is updated and the address learning process is complete. If the address is not found then the address is added to the forwarding database and if the port the frame was received on is not an LFLNS then the address learning process is complete. But if the receiving interface is an LFLNS then the limited-flood mask is updated.

FIG. 17 depicts the process for updating and maintaining the limited-flood masks. When a new address is being added to the forwarding database for an LNS, a count for the number of addresses known for the LNS that address was received on as a source address is incremented by 1. The counter would be initialized to a value of 0 before any addresses were learned. If the number of addresses for an LFLNS has reached or exceeded the maximum number expected for that LFLNS (often the max will be 1) the limited flood mask of FIG. 15 will have the bit value set to 0 (loaded) for that segment. Otherwise the bit value will be set to 1 (not loaded). The mask would be initialize to all unloaded (all 1s).

An alternate exemplary embodiment of the current invention would perform a lookup of all the addresses in the forwarding table for the source LNS. If the number of addresses know for the LNS is equal to or greater than the maximum number expected for that LFLNS then the limited flood mask of FIG. 15 will have the bit value set to 0 (loaded) for that segment. Otherwise the bit value will be set to 1 (not loaded).

Figure 18:
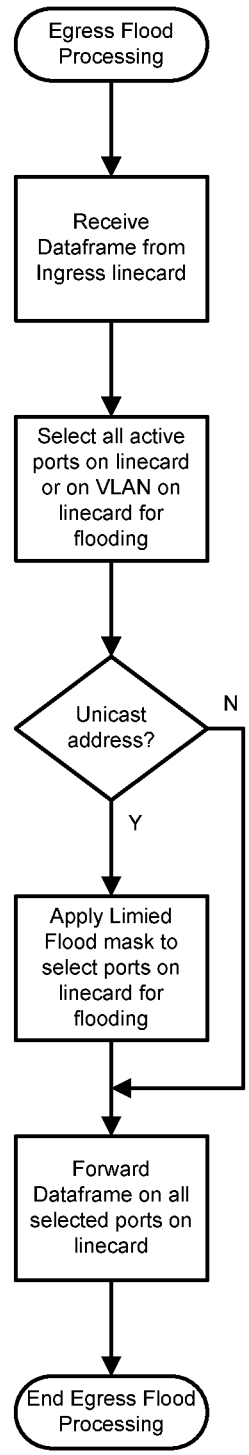
FIG. 18 illustrates the processing for unicast flooding when a destination address is not in the forwarding table.

FIG. 18 depicts how the limited flood mask of FIG. 15 is used in egress flood processing. The egress line card receives the frame for the ingress line card (they can be the same card) that needs to be flooded because the destination address is not in the forwarding table. If the switching device supports VLANs, the egress line card performs a logical AND function to the port list to select only the ports associated with the target VLAN. The egress line card then determines if the destination address is a unicast address for example by examining the address bit identified in FIG. 12. If the destination address is not a unicast address then the frame is flooded out the selected ports. If the destination address is a unicast address and the frame is to be flooded out all ports for a particular VLAN because the destination address is not in the forwarding table, then a logical AND function can be performed with the limited flood mask of FIG. 15 on the list of selected ports to exclude flooding the frame out loaded LFLNS and the frame will be flooded out the ports selected by the AND function of the ports on the line card, the VLAN mask if VLANs are utilized, and the limited-flood mask.

Figure 19:
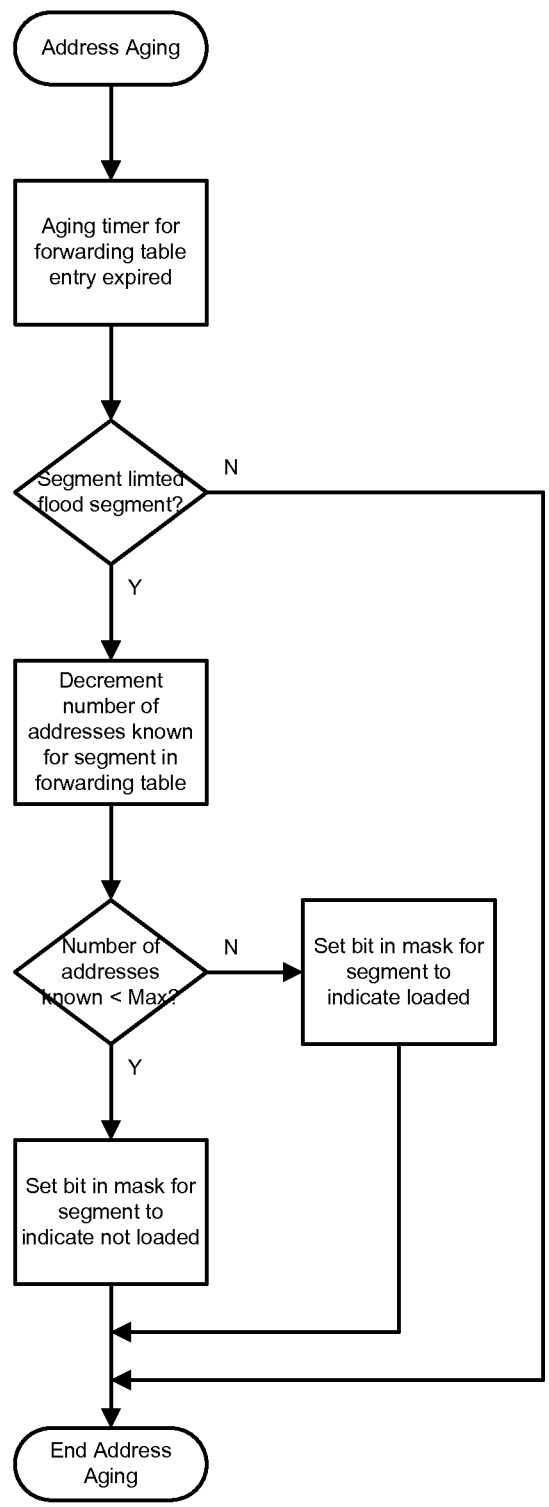
FIG. 19 illustrates the improved address aging process.

The maximum number of concurrent device addresses for an LFLNS will be determined. When a particular device address is no longer in use on an LNS, it will age out of the forwarding table the same as any dynamically learned address in the prior art. However, as depicted in FIG. 19, with the current invention, when an address in the table ages out for an LNS, the process of FIG. 19 checks if the LNS is an LFLNS. If it is not then no additional processing is necessary as part of the address aging process. If the LNS is an LFLNS then the count of the number of known addresses for the segment needs to be decremented. Then the process checks if the number of known addresses for the LNS has dropped below the expected maximum number of concurrent device addresses for the segment. If it has, then the LFLNS is no longer loaded and the limited flooding mask depicted in FIG. 15 needs to be updated to indicate the LFLNS is no longer loaded (bit value 1). If the number of addresses is still greater than or equal to the expected maximum number of concurrent device addresses for the segment then the LFLNS is still loaded and the value in the limited flooding mask should be set to 0.

An alternate exemplary embodiment of the current invention would perform a lookup of all the addresses in the forwarding table for the source LNS. If the number of addresses know for the LNS is equal to or greater than the maximum number expected for that LFLNS then the limited flood mask of FIG. 15 will have the bit value set to 0 (loaded) for that segment. Otherwise the bit value will be set to 1 (not loaded).

Figure 20:
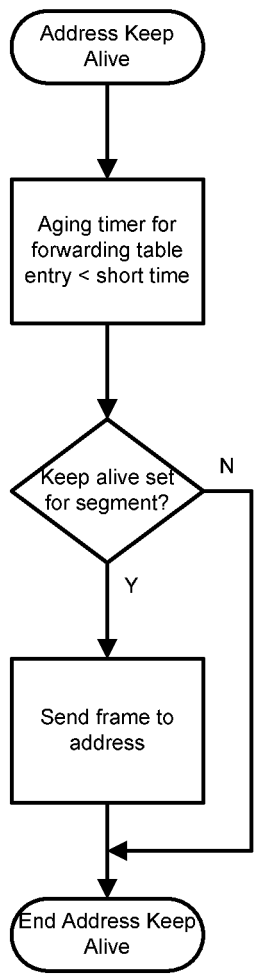
FIG. 20 illustrates the address keep alive processing.

In addition, there may be times when it is preferable to not have dynamical addresses age out if the destination device is still connected, but not sending source frames so that the LSLNS does not revert to being flooded when a device is not sending frames for a long period of time. In particular, this might be useful when there is more than one logical segment utilizing one physical network segment and the flooding of the silent LFLNS might impact the other LFLNS. To this end, FIG. 20 depicts a process for keeping the silent device address in the forwarding table. At some predetermined "short" time before the device address ages out of the forwarding table, the keep alive process checks if the LNS is set for dynamic address keep alives. If so, the switching device generates and sends to the device a frame that should receive a response such as a reverse address resolution protocol request (RARP). When the response is sent from the device, the source device address is seen in the frame causing the last seen timer to be reset and device address does not age out of the table. If the LSN is not configured for dynamic address keep alives then the does not do anything to try to solicit a response and the address ages out of the forwarding table if the device does not send a frame of its own volition before the aging timer pops. RARP is just one example of a frame that might be sent to attempt to solicit a response from the device.

Figure 21:
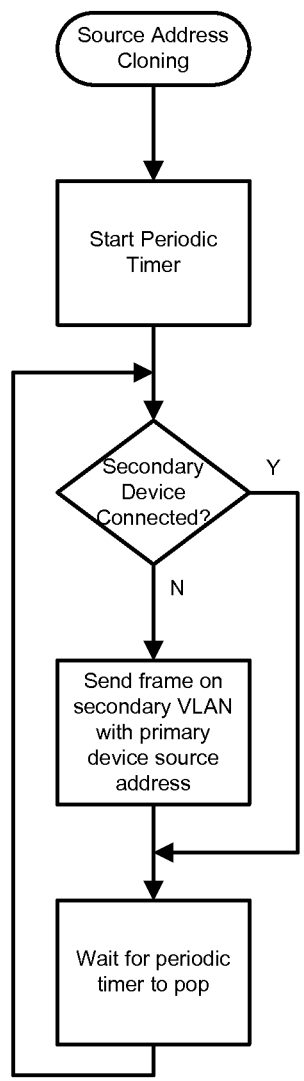
FIG. 21 illustrates the addresses cloning process.

Along the same lines, it can be useful to not have an LFLNS flooded when a device is not connected to the VLAN for that LFLNS. For example with an IP Phone with an integrated data switch port. If a computer is not connected to the data switch port of the IP phone or the computer is powered off, the VLAN for the data switch port will have unicast flood traffic forwarded on it. FIG. 21 depicts a mechanism for use on a device such as the IP phone where when the computer is not attached to the switch port or is powered off, the device will send occasional frames on the VLAN with its own MAC address as the source address. If the VLAN on the switch for the data switch port were configured as an LFLNS with an maximum number of address of 1, when the data port is not in use the device will cause one address to still stay in the forwarding table so that flooding will not occur on the segment, but when the computer is connected and powered up, the device address for the device will age out. Also, an entry for the computer will be added as soon as it sends a frame even if the device address for the IP phone has not yet aged out. So, the process of FIG. 21 would start a periodic timer. When the timer pops, the device checks if the secondary device is connected (the computer connected to the data port on the IP phone). If the secondary device is connected the process just waits for the next time the timer pops. If the secondary device is not connected then primary device (the IP phone) sends a frame on the VLAN for the secondary device using the primary's address and then waits for the timer to pop again.

Figure 1:
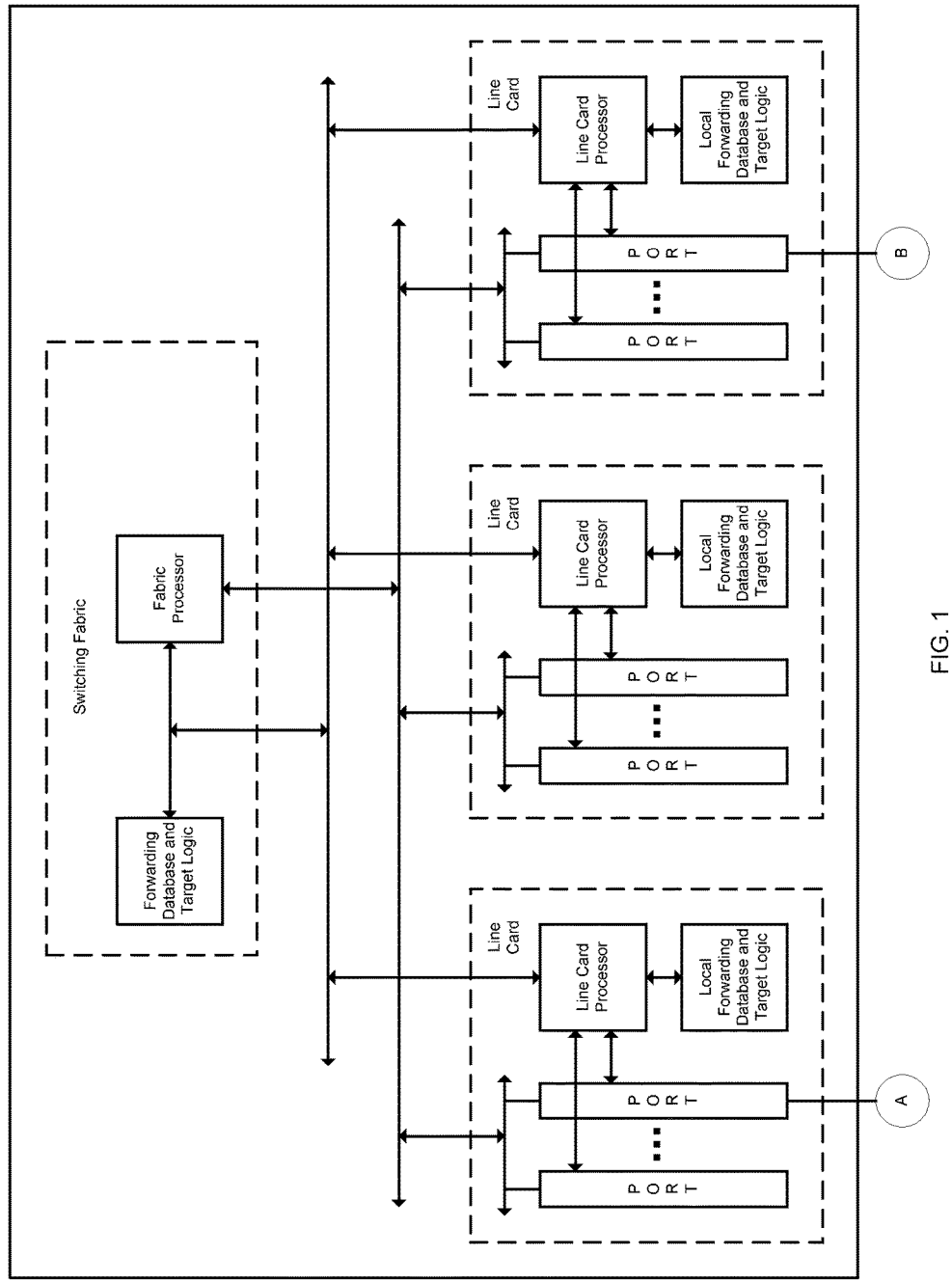
FIG. 1 is a block diagram for a prior art switching device.
Figure 2:
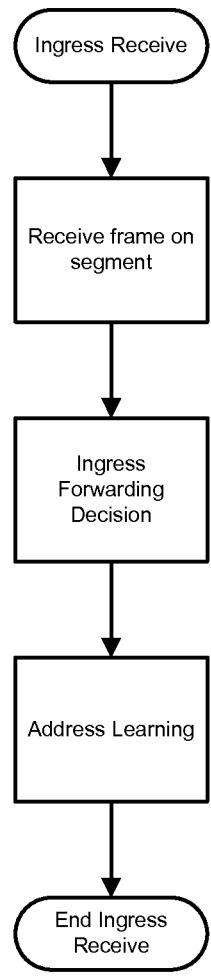
FIG. 2 illustrates the prior art process of a frame being received on a network segment.
Figure 3:
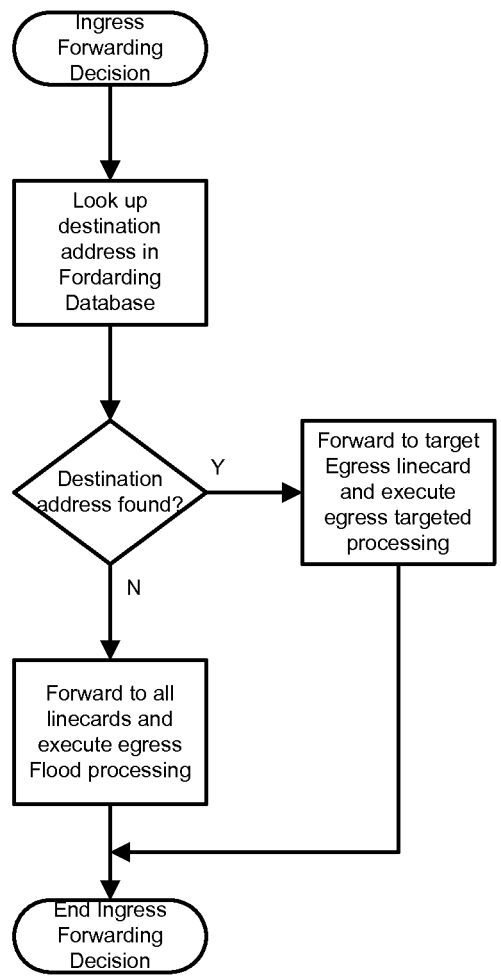
FIG. 3 illustrates the prior art forwarding decision process when a frame is received on a network segment.
Figure 4:
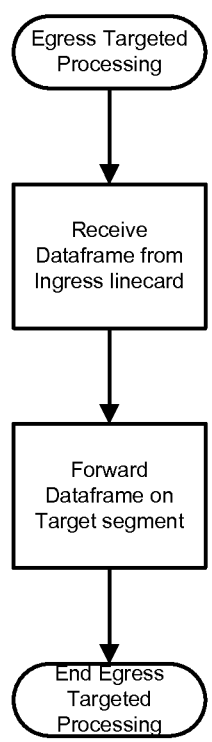
FIG. 4 illustrates the prior art process of forwarding a frame on a network segment when the destination address is in the forwarding table.
Figure 5:
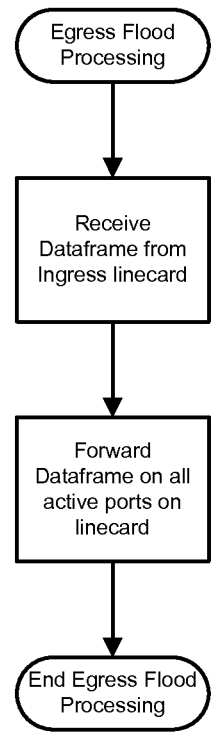
FIG. 5 illustrates the prior art process of forwarding a frame on all network segments when the destination address is not in the forwarding table.
Figure 6:
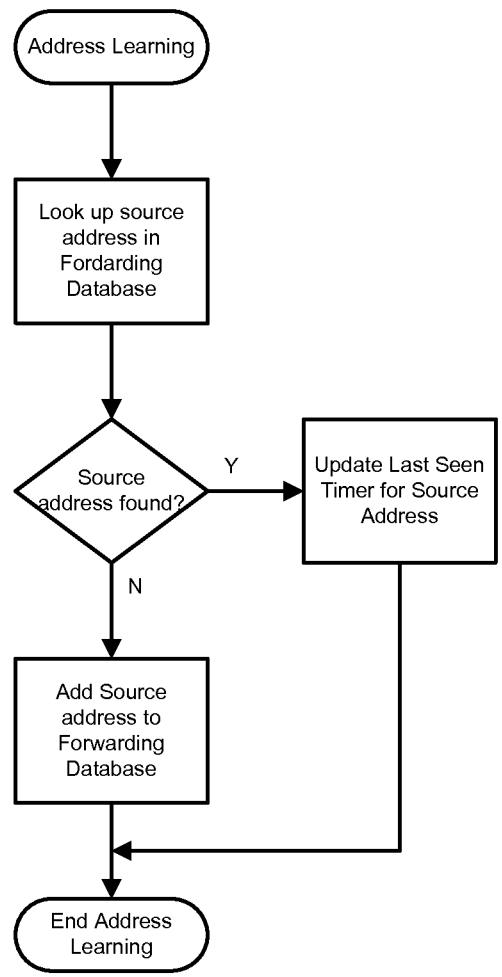
FIG. 6 illustrates the prior art address learning processing when a frame is received on a network segment.
Figure 7:
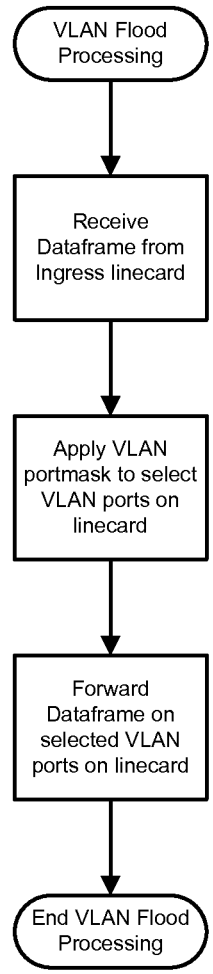
FIG. 7 illustrates the prior art process of forwarding a frame on all network segments that are a part of a particular VLAN when the destination address is not in the forwarding table.
Figure 8:
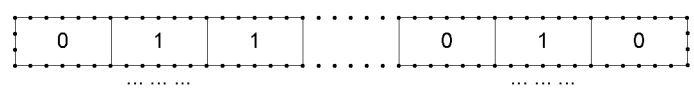
FIG. 8 depicts a prior art VLAN Port Mask for identifying which ports are in a particular VLAN.
Figure 22:
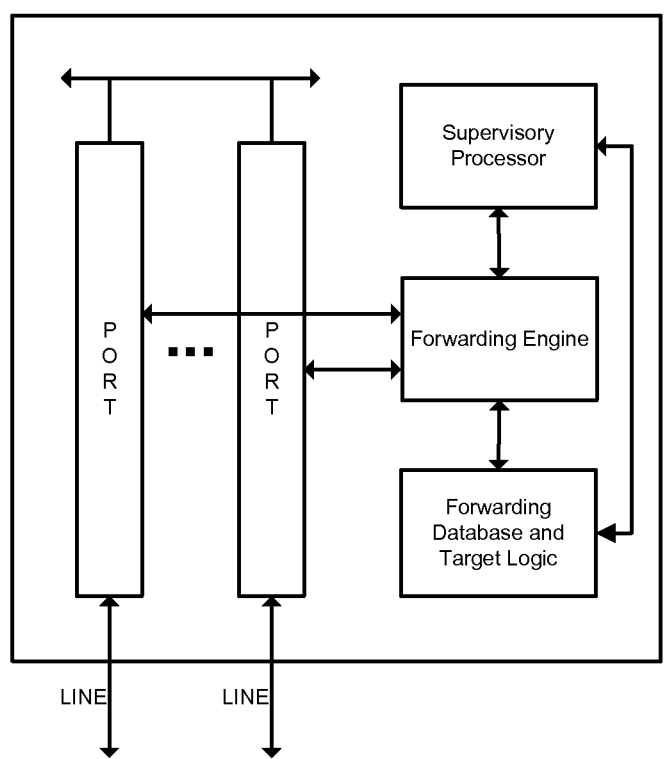
FIG. 22 is a block diagram of a simple switching device.

The exemplary embodiments have used terminology appropriate for switching devices with multiple line cards as depicted in FIG. 1. This should not be considered as limited the scope of this invention only to platforms with multiple line cards. FIG. 22 depicts a simple switching device with a single supervisory processor, a single forwarding engine and a single forwarding database. This present invention is equally applicable to a switching device such as is depicted in FIG. 22.

While the description above refers to particular embodiments of the present invention, it will be understood that many modifications may be made without departing from the spirit thereof. The accompanying claims are intended to cover such modifications as would fall within the true scope and spirit of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of limiting flooding on a network comprising:
   a) determining if a port is identified for a limited flooding process;
   b) when the port is identified for the limited flooding process, determining if the port will not currently have any devices with unknown destination addresses connected to the port;

c) when it is determined that the port will not currently have any devices with the unknown destination addresses connected to the port, suppressing the forwarding of unicast frames with the unknown destination addresses on the port, determining if the port is in a full duplex port;

if the port is in the full duplex port, determining if the port is in a trunk mode;

if the port is not in the trunk mode, determining if a bridge protocol data unit has been received;

if the bridge protocol data unit has not been received, setting the port for the limited flooding process; and when the port is not in the full duplex port, not setting the port to the limited flooding process.

2. The method of claim 1, further including the step of when the port is in the trunk mode, not setting the port to the limited flooding process.

3. The method of claim 1, further including the step of when the bridge protocol data unit has been received, not setting the port to the limited flooding process.

* * * * *